(12) United States Patent
Hahm et al.

(10) Patent No.: US 8,797,598 B2
(45) Date of Patent: *Aug. 5, 2014

(54) PRINT CONTROL TERMINAL, IMAGE FORMING APPARATUS, PRINT CONTROL METHOD, AND IMAGE FORMING METHOD

(71) Applicant: Samsung Electronics Co., Ltd, Suwon-si (KR)

(72) Inventors: Jong-min Hahm, Suwon-si (KR); Hae-kee Lee, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/933,219

(22) Filed: Jul. 2, 2013

(65) Prior Publication Data

US 2013/0321870 A1 Dec. 5, 2013

Related U.S. Application Data

(63) Continuation of application No. 12/750,786, filed on Mar. 31, 2010, now Pat. No. 8,503,029.

(30) Foreign Application Priority Data

Nov. 11, 2009 (KR) ........................ 10-2009-0108374

(51) Int. Cl.
*G06F 15/00* (2006.01)

(52) U.S. Cl.
USPC ............................ 358/1.9; 358/3.06; 358/3.1

(58) Field of Classification Search
None
See application file for complete search history.

(56) References Cited

U.S. PATENT DOCUMENTS

| 8,503,029 B2 * | 8/2013 | Hahm et al. .................... 358/1.9 |
| 2008/0062447 A1 * | 3/2008 | Bai et al. ...................... 358/1.13 |
| 2010/0134809 A1 * | 6/2010 | Chang ............................ 358/1.9 |

* cited by examiner

*Primary Examiner* — Mark Zimmerman
*Assistant Examiner* — Helen Q Zong
(74) *Attorney, Agent, or Firm* — Stanzione & Kim, LLP (57) ABSTRACT

A print control terminal including a user interface to receive a setting of a print command and print options of a document, a screen selection unit to select a halftone screen to be applied to the document, a transparency multiple number selection unit to select a transparency multiple number to correspond to the selected halftone screen, a print data generation unit to generate print data of the document according to the selected transparency multiple number, and a communication interface to transmit the generated print data and the print options to the image forming apparatus. A transparency multiple number is changed according to the characteristics of a halftone screen to improve quality of an output image.

24 Claims, 10 Drawing Sheets

ORIGINAL PATTERN

FIG. 3B
(RELATED ART)

PATTERN OF TRANSPARENCY MULTIPLE NUMBER 2×2

PRINT CONTROL TERMINAL, IMAGE FORMING APPARATUS, PRINT CONTROL METHOD, AND IMAGE FORMING METHOD

CROSS-REFERENCE TO RELATED APPLICATIONS

This application is a Continuation Application of prior application Ser. No. 12/750,786, filed on Mar. 31, 2010 in the United States Patent and Trademark Office which claims priority under 35 U.S.C. §119(a) from Korean Patent Application No. 2009-108374, filed on Nov. 11, 2009, in the Korean Intellectual Property Office, the contents of which are incorporated herein by reference in its entirety.

BACKGROUND

1. Field of the Invention

The present general inventive concept relates to a print control terminal, an image forming apparatus, a print control method, and an image forming method, and more particularly, to a print control terminal, an image forming apparatus, a print control method, and an image forming method to improve the quality of an output image in a manner of changing a transparency multiple number according to the characteristics of a halftone screen.

2. Description of the Related Art

Usually, an image forming apparatus indicates a device which prints print data generated by a terminal such as a computer on a printing medium. Such an image forming apparatus may be a copy machine, a printer, a fax machine, or an MFP (multifunction peripheral) which integrates functions of these devices in one device.

To output an image containing a plurality of objects, an image forming apparatus processes the objects starting from the ones in the rearmost portion to the ones in the foremost portion, stores the processed objects in an output buffer, and then outputs the image. If there is an object having transparency, the image forming apparatus embodies the transparency using masking. That is, the image forming apparatus assigns a mask value of 0 or 1 to each pixel. If mask value 0 is assigned to a pixel, the image forming apparatus replaces the value pre-stored in the output buffer with color of the object having transparency, and if mask value 1 is assigned to a pixel, the image forming apparatus retains the value pre-stored in the output buffer.

There are generally two methods to process transparency: a download pattern method, and a bitmap transparency method. The download pattern method tilts a specific pattern (for example, a pattern having 16×16 pixels) to fit in a predetermined area, creates a mask, and processes a transparency using the mask, which is used when a large area should be processed to have a constant transparency. The bitmap transparency method assigns a mask value one by one for each pixel, which is used for objects having a gradation transparency where each pixel has a different transparency value.

Figure 3A:
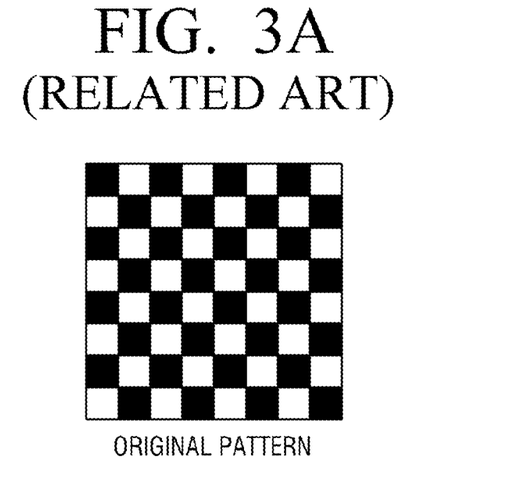
FIGS. 3A and 3B are views illustrating examples of transparency patterns corresponding to a transparency of 50%.
Figure 3B:
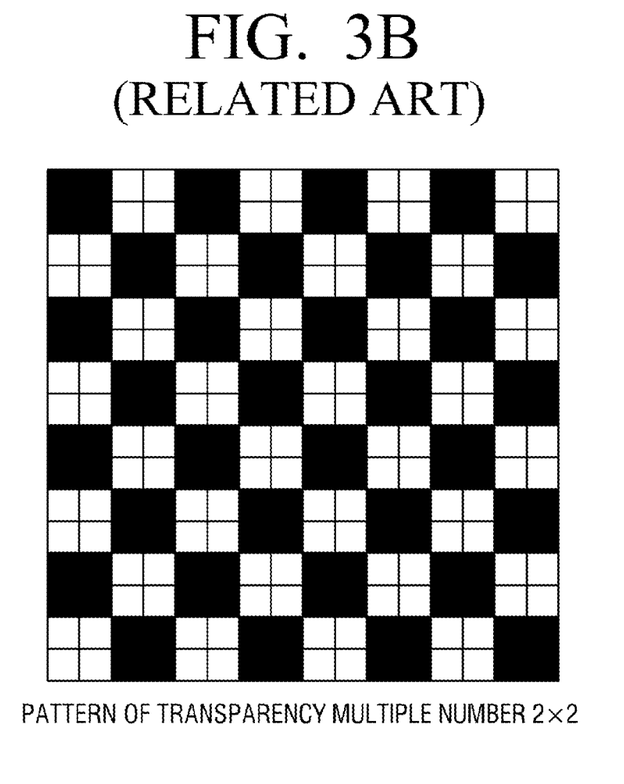

In the download pattern method, a specific pattern (for example, a pattern having 16×16 pixels) may be either tilted as it is, or be enlarged and then tilted. Specifically, FIGS. 3A and 3B illustrate an image in which a download pattern having transparency of 50% (FIG. 3A) is enlarged to twice the width and the height (FIG. 3B). The ratio of enlarging a pattern is referred to as a transparency multiple number, and the transparency multiple number will be described as (width times)×(height times), hereinbelow. For instance, transparency multiple number 4×4 represents that a download pattern having transparency of 50% is enlarged to four times the width and the height.

Conventional image forming apparatuses process a transparency for all of the output options and all colors using only a single transparency pattern. However, if a specific halftone screen is combined with a specific transparency multiple number, the transparency multiple number needs to be adjusted according to the halftone screen to prevent image quality degradation.

Figure 4A:
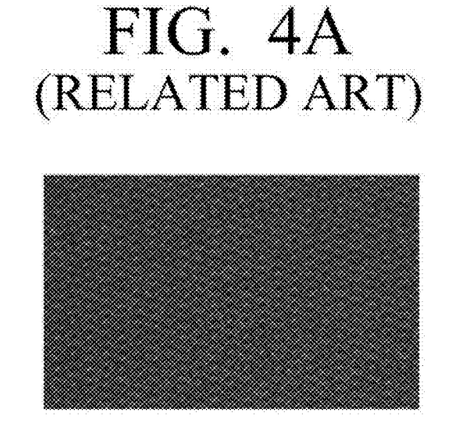
FIGS. 4A and 4B are output images to which the same transparency multiple number 4×4 and different halftone screens are applied according to an exemplary embodiment of the present general inventive concept.
Figure 4B:
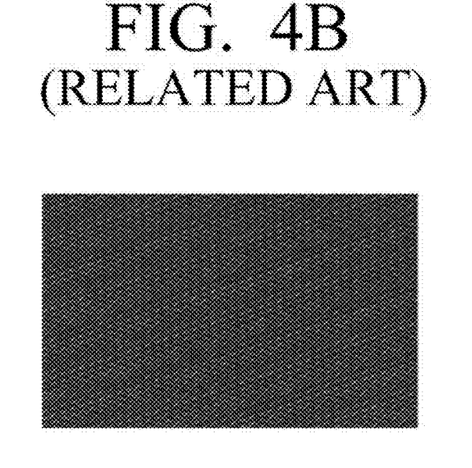

FIGS. 4A and 4B are examples of output images to which the same transparency multiple number 4×4 and different halftone screens are applied. Specifically, FIG. 4A illustrates an image to which a halftone screen having 190 line per inches (LPI) and transparency multiple number 4×4 are applied, and FIG. 4B illustrates an image to which a halftone screen having C:158 LPI, M:172 LPI, and transparency multiple number 4×4 are applied.

Referring to FIGS. 4A and 4B, it can be seen that even when the same transparency multiple number is used to process the transparency of an image, image quality degradation such as visible white lines may occur when a specific halftone screen is applied.

SUMMARY

Example embodiments of the present general inventive concept provide a print control terminal, an image forming apparatus, a print control method, and an image forming method to change a transparency multiple number according to the characteristics of a halftone screen to improve the quality of an output image.

Additional embodiments of the present general inventive concept will be set forth in part in the description which follows and, in part, will be obvious from the description, or may be learned by practice of the general inventive concept.

Example embodiments of the present general inventive concept may be achieved by providing a print control terminal connected to an image forming apparatus, the print control terminal including a user interface to receive a setting of a print command and print options of a document, a screen selection unit to select a halftone screen to be applied to the document, a transparency multiple number selection unit to select a transparency multiple number to correspond to the selected halftone screen, a print data generation unit to generate print data of the document according to the selected transparency multiple number, and a communication interface to transmit the generated print data and the print options to the image forming apparatus.

The screen selection unit may select a halftone screen using information regarding the quality of printing, color printing, and edge enhancement printing among the set print options.

The transparency multiple number selection unit may select a transparency multiple number with consideration of lines per inch (LPI), angle, and dot growth of the selected halftone screen.

The print control terminal may further include a storage unit to store a transparency multiple number corresponding to LPI, angle, and dot growth of a halftone screen in a lookup table.

The transparency multiple number selection unit may select a transparency multiple number based on the lookup table stored in the storage unit.

Example embodiments of the present general inventive concept may also be achieved by providing an image forming apparatus connected to a print control terminal, the image forming apparatus including a communication interface to receive print data and print options, a screen selection unit to select a halftone screen to be applied to the print data based on the received print options, a transparency multiple number selection unit to select a transparency multiple number to correspond to the selected halftone screen, and an image forming unit to print the received print data using the selected halftone screen and transparency multiple number.

The screen selection unit may select a halftone screen using information regarding the quality of printing, color printing, and edge enhancement printing among the received print options.

The transparency selection unit may select a transparency multiple number with consideration of lines per inch (LPI), angle, and dot growth of the selected halftone screen.

The image forming apparatus may further include a storage unit to store a transparency multiple number corresponding to LPI, angle, and dot growth of a halftone screen in a lookup table.

The transparency multiple number selection unit may select a transparency multiple number based on the lookup table stored in the storage unit.

Example embodiments of the present general inventive concept may also be achieved by providing a print control method of a print control terminal connected to an image forming apparatus, the print control method including receiving a setting of a print command and print options of a document, selecting a halftone screen to be applied to the document, selecting a transparency multiple number to correspond to the selected halftone screen, generating print data of the document according to the selected transparency multiple number, and transmitting the generated print data and the print options to the image forming apparatus.

The selecting a halftone screen may include selecting a halftone screen using information regarding the quality of printing, color printing, and edge enhancement printing among the set print options.

The selecting a transparency multiple number may include selecting a transparency multiple number with consideration of lines per inch (LPI), angle, and dot growth of the selected halftone screen.

The print control method may further include pre-storing transparency multiple numbers corresponding to LPI, angle, and dot growth of halftone screens in a lookup table.

The selecting a transparency multiple number may include selecting a transparency multiple number based on the pre-stored lookup table.

Example embodiments of the present general inventive concept may also be achieved by providing an image forming method of an image forming apparatus connected to the print control terminal, the image forming method including receiving print data and print options, selecting a halftone screen to be applied to the print data based on the received print options, selecting a transparency multiple number to correspond to the selected halftone screen, and printing the received print data using the selected halftone screen and transparency multiple number.

The selecting a screen may include selecting a halftone screen using information regarding the quality of printing, color printing, and edge enhancement printing among the received print options.

The selecting a transparency multiple number may include selecting a transparency multiple number with consideration of lines per inch (LPI), angle, and dot growth of the selected halftone screen.

The image forming method may further include pre-storing transparency multiple numbers corresponding to LPI, angle, and dot growth of halftone screens in a lookup table.

The selecting a transparency multiple number may include selecting a transparency multiple number based on the pre-stored lookup table.

Example embodiments of the present general inventive concept may also be achieved by providing a method of controlling an image forming apparatus, including transmitting image data to the image forming apparatus, selecting a halftone screen based on the image data, selecting a transparency multiple number based on a characteristic of the selected halftone screen, and forming an output image according to the selected halftone screen and transparency multiple number.

The value of the selected transparency multiple number may change based on a predetermined image quality associated with the selected halftone screen and output image.

The selecting of a halftone screen may be based on print options set by a user.

Example embodiments of the present general inventive concept may also be achieved by providing an image forming apparatus, including a communication interface to receive image data, a control unit to select a halftone screen based on the image data and a transparency multiple number based on a characteristic of the selected halftone screen, and an image forming unit to form an output image according to the selected halftone screen and transparency multiple number.

The image data may include print options set by a user, and the value of the selected transparency multiple number may change based on a predetermined image quality associated with the selected halftone screen and output image.

Example embodiments of the present general inventive concept may also be achieved by providing an image forming apparatus, including an image forming unit, and a controller to control the image forming unit to form an image on a print medium according to information on a selected halftone screen pattern and a transparency multiple number based on the selected halftone screen pattern.

The image forming apparatus may further include a storage unit to store a lookup table containing information on a plurality of halftone screen patterns and corresponding transparency multiple numbers, and a user interface to select a halftone screen pattern to be applied to the image.

BRIEF DESCRIPTION OF THE DRAWINGS

These and/or other embodiments of the present general inventive concept will become apparent and more readily appreciated from the following description of the embodiments, taken in conjunction with the accompanying drawings of which:

FIGS. 5A to 6D are output images of transparency objects according to halftone screens according to an exemplary embodiment of the present general inventive concept;

DETAILED DESCRIPTION OF THE EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
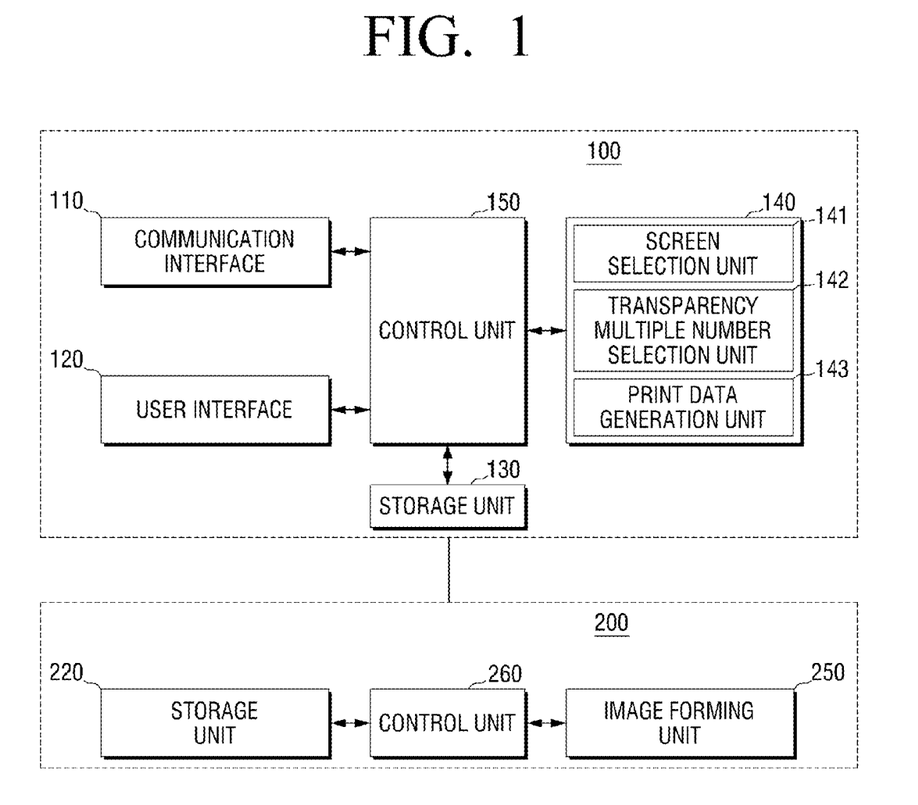
FIG. 1 is a block diagram illustrating a print control terminal connected to an image forming apparatus according to an exemplary embodiment of the present general inventive concept.

FIG. 1 is a block diagram illustrating a print control terminal 100 according to an exemplary embodiment of the present general inventive concept.

Referring to FIG. 1, the print control terminal 100 includes a communication interface 110, a user interface 120, a storage unit 130, a driver 140, and a control unit 150.

The print control terminal 100 can be connected to an image forming apparatus 200 via the communication interface 110 to provide print data and print options to the image forming apparatus 200 such that the image forming apparatus can process the print data and print options provided via the communication interface 110. The print data processed by the image forming apparatus 200 can include a printer command language (PCL), page description language (PDL) data written in a postscript (PS) language, and a XML Paper Specification (XPS) file. For example, the communication interface 110 may be configured as a parallel port, a universal serial bus (USB) port, a wireless port, or other type of connection port to connect the print control terminal 100 to an external device.

The user interface 120 includes a plurality of function keys enabling a user to set or select various functions supported by the print control terminal 100 to generate a user input signal. The user interface 120 displays various information provided by the print control terminal 100 according to the user input signal. The user interface 120 may be implemented in the form of a touch pad device to support concurrent input and output, or may be implemented in the form of a device combining functions of a mouse and a monitor to generate the user input signal, although the present general inventive concept is not limited thereto. The user interface 120 may display printable documents to the user, and the user may set a document desired to be printed and a print option of the document through an interface window of the user interface 120. The control unit 150 generates a control signal corresponding to the user interface 120 according to the user input signal to control the user interface 120 and other components of the print control terminal 100.

The storage unit 130 may include any type of volatile or non-volatile memory unit to store a transparency multiple number corresponding to a halftone screen pattern in a lookup table. For example, the storage unit 130 may be implemented as an external storage medium, a removable disc including a universal serial bus (USB) memory, a web server via a network, and as a storage medium in the print control terminal 100. The lookup table stored in the storage unit 130 will be described in more detail below with reference to a transparency multiple number selection unit 142 of the driver 140, as well as Tables 1 and 2 below.

Referring again to FIG. 1, the driver 140 includes a screen selection unit 141, a transparency multiple number selection unit 142, and a print data generation unit 143. The driver 140 generates print data associated with a document selected by a user to be printed.

The screen selection unit 141 selects a halftone screen to be applied to a document. For example, the screen selection unit 141 may select a halftone screen in response to a print option selected by a user using the user interface 120. It is possible that the user can set one or more objects or sub-images included in the image corresponding to the document as the halftone screen, for example, using the user interface 120. It is also possible that the user can select a halftone screen to be applied to a portion of the document or all portions of the document. For example, it is possible that the user can set one or more of the objects or sub-images of the document as the halftone screen using the user interface 120 to generate a user input signal to control the screen selection unit 141.

Figure 2:
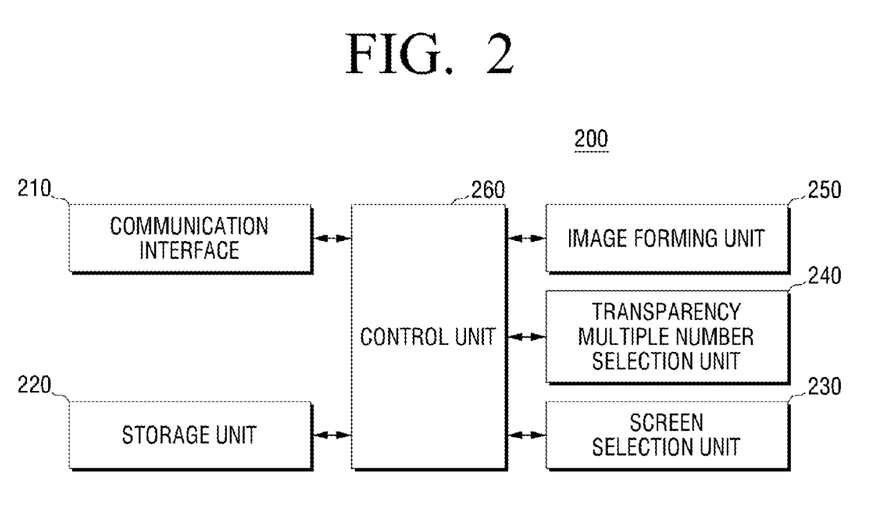
FIG. 2 is a block diagram illustrating an image forming apparatus according to an exemplary embodiment of the present general inventive concept.

Referring to FIGS. 1 and 2, the image forming apparatus 200 may be a copy machine, a printer, a fax machine, a multifunction peripheral (MFP), or other known or later developed image forming apparatus. In the embodiment of FIG. 1, the image forming apparatus 200 may include a storage unit 220, an image forming unit 250, and a control unit 260. The storage unit 220 may be used to store image data to be processed and printed, including the transparency multiple number information corresponding to various halftone screen patterns (e.g., lines per inch (LPI) pattern) received from the print control terminal 100. The image forming unit 250 may include a print medium feeding unit and a printing unit to form an image on a print medium according to the information on the transparency multiple number and the halftone screen pattern. The control unit 260 communicates with the storage unit and the image forming unit 250 to control operations of the image forming apparatus 200.

Halftoning is a process of converting multi-tone images into a binary-tone format. The quality of document is affected by the manner in which a halftoning process is performed. Therefore, traditional image forming apparatuses perform halftoning using different halftone screens according to print options selected by a user.

Referring to FIG. 1, the screen selection unit 141 recognizes print options including the quality of printing such as high quality printing, normal printing, and high speed printing, color printing, and edge enhancement printing, and selects a proper halftone screen according to the print options. It is possible that the user may set a portion or all portions of an image corresponding to the document as a halftone screen, through the above selection or user interface process, for example, setting print options.

Halftoning processes may be performed on the print control terminal 100, and may also be performed on the image forming apparatus 200. If halftoning is performed on the image forming apparatus 200, the screen selection unit 141 receives information regarding the type of halftone screen performed by the image forming apparatus 200 and the applicable conditions from the communication interface 110, and selects a proper halftone screen using the information.

The transparency multiple number selection unit 142 selects a transparency multiple number to correspond to the selected halftone screen. That is, the transparency multiple number selection unit 142 may select the transparency multiple number which does not cause a problem of image quality degradation when used with the selected halftone screen.

For example, if a transparency operation is performed using transparency multiple number 1×1, a transparency image has a smooth output. This is because a transparency pattern itself operates as a high lines per inch (LPI) screen. However, when a high LPI halftone screen is used or when there is a possibility that jitter will occur, performing a transparency operation using transparency multiple number 1×1 may worsen the jitter, and image quality degradation may occur. An example of image quality degradation caused by the transparency multiple number will be described in more detail below with reference to FIGS. 4 and 5.

Referring to FIG. 1, the transparency multiple number selection unit 142 may select one of transparency multiple numbers 1×1, 2×2, and 4×4 with consideration of lines per inch (LPI), angle, and dot growth of the selected halftone screen.

The transparency multiple number selection unit 142 may select the transparency multiple number corresponding to the selected halftone screen using a lookup table pre-stored in the storage unit 130. For example, a developer can perform a halftoning process on all of the applicable halftone screens using all of the applicable transparency multiple numbers, can create lookup tables as illustrated in Tables 1 and 2, and can pre-store the lookup tables in the storage unit 130. In this embodiment, the transparency multiple number selection unit 142 selects the transparency multiple number to be applied to the halftone screen using the pre-stored lookup table. Table 1 is an example of a lookup table to store whether image quality degradation occurs on each halftone screen for each transparency multiple number, and Table 2 is an example of a lookup table to store an optimal transparency multiple number for each halftone screen. The first, second, third, and fourth halftone screens correspond to different halftone screens having different line per inch (LPI) values which can be selectively applied to selected portions (or all portions) of the image corresponding to a document. It is possible that more or less halftone screens having various LPI values could also be used.

TABLE 1

|  | transparency multiple number 1 × 1 | transparency multiple number 2 × 2 | transparency multiple number 4 × 4 |
|---|---|---|---|
| first screen | O | O | X |
| second screen | O | X | X |
| third screen | X | O | O |
| Fourth screen | O | X | O |

Herein, "O" represents the non-occurrence of image quality degradation, and "X" represents the occurrence of image quality degradation.

TABLE 2

| type of screen | optical transparency multiple number |
|---|---|
| first screen | transparency multiple number 1 × 1 |
| second screen | transparency multiple number 4 × 4 |
| third screen | transparency multiple number 1 × 1 |
| fourth screen | transparency multiple number 2 × 2 |

The print data generation unit 143 generates print data of a document according to the selected transparency multiple number. That is, the print data generation unit 143 may set print data so that the transparency operation is performed on the print data using the transparency multiple number selected by the transparency multiple number selection unit 142. For example, it is possible that the user can select one or more halftone screens to be applied to selected portions, or all portions, of the document image using the user interface 120, and the transparency multiple number selection unit 142 then selects the transparency multiple number corresponding to the selected halftone screens using the pre-stored lookup tables.

The control unit 150 controls elements of the print control terminal 100. For example, the control unit 150 controls the user interface 120 to display a user interface (UI) window if a print command is received through the user interface 120 so that a user selects a print option for a corresponding document through the UI window. The control unit 150 controls the driver 140 to decide a halftone screen and a transparency multiple number corresponding to the print option selected by the user, and to generate print data according to the decided transparency multiple number.

The control unit 150 may determine whether to perform a transparency operation on the document selected by a user. For example, if the document selected by a user does not contain any object to which a transparency is to be applied, or if a print option regarding applying a transparency operation is not set on the document, the control unit 150 may determine not to perform the above transparency operation. Accordingly, the control unit 150 can determine in advance whether perform a transparency operation on the document selected by a user, and can control the driver 140 accordingly.

Referring to FIG. 1, the control unit 150 communicates with the communication interface 110, the user interface 120, the storage unit 130, and the driver 140. The control unit 150 controls the communication interface 110 to transmit generated print data to an image forming apparatus, and controls the storage unit 130 to store the print data generated by the driver 140. Accordingly, since the document selected by a user may be repeatedly used, the storage unit 130 may store the generated print data.

As described above, the print control terminal 100 according to an exemplary embodiment of the present general inventive concept can select a halftone screen corresponding to a print option selected by a user, and can change a transparency multiple number according to the characteristics of the selected halftone screen to reduce image quality degradation and improve the quality of an output image.

FIG. 2 is a block diagram illustrating an image forming apparatus 200 according to an exemplary embodiment of the present general inventive concept.

Referring to FIG. 2, the image forming apparatus 200 includes a communication interface 210, a storage unit 220, a screen selection unit 230, a transparency multiple number selection unit 240, an image forming unit 250, and a control unit 260. The control unit 260 communicates with the communication interface 210, the storage unit 220, the screen selection unit 230, the transparency multiple number selection unit 240, and the image forming unit 250.

The communication interface 210 is connected to the print control terminal 100 (FIG. 1), and receives print data and print options from the print control terminal 100. For example, the communication interface 210 may be configured as a parallel port, a universal serial bus (USB) port, a wireless port, or other type of connection port to connect the image forming apparatus 200 to an external device. In this exemplary embodiment of the present general inventive concept, the print data and the print options are transmitted separately, but if, for example, the print data includes the print options, it is possible to transmit the print data only.

The storage unit 220 stores a transparency multiple number corresponding to a halftone screen pattern in a lookup table. Since an exemplary lookup table has been described above, a detailed description thereof will be omitted here for convenience of description.

Referring to FIG. 2, the screen selection unit 230 selects a halftone screen to be applied to print data. Specifically, the screen selection unit 230 may select a halftone screen based on consideration of the quality of printing, color printing, edge enhancement printing, and other printing options among the print options received through the communication interface 210.

The transparency multiple number selection unit 240 selects a transparency multiple number to correspond to the selected halftone screen. For example, the transparency multiple number selection unit 240 may select one of transparency multiple numbers 1×1, 2×2, and 4×4 based on consideration of lines per inch (LPI), angle, and dot growth of the selected halftone screen.

The transparency multiple number selection unit 240 may select the transparency multiple number corresponding to the selected halftone screen using a lookup table pre-stored in the storage unit 220.

The image forming unit 250 prints the received print data according to a selected halftone screen and a selected transparency multiple number. For example, the image forming unit 250 renders print data received through the communication interface 210 based on the halftone screen selected by the screen selection unit 230 and the transparency multiple number selected by the transparency multiple number selection unit 240, and then prints the rendered print data according to the selections.

The control unit 260 communicates with the communication interface 210, storage unit 220, screen selection unit 230, transparency multiple number selection unit 240, and image forming unit 250 to control elements of the image forming apparatus 200. For example, if the control unit 260 receives print data and print options through the communication interface 210, the control unit 260 controls the screen selection unit 230 to select a halftone screen. If, among the received print options, the print options regarding transparency are set, the control unit 260 may control the transparency multiple number selection unit 240 to select a transparency multiple number.

Accordingly, if the halftone screen and the transparency multiple number are selected, the control unit 260 controls the image forming unit 250 to print the received print data according to the selected halftone screen and transparency multiple number.

The control unit 260 controls the storage unit 220 to store the received print data. Since print data transmitted from the print control terminal 100 may be repeatedly output, the control unit 260 may store the received print data in the storage unit 220.

In the exemplary embodiment of FIG. 2, the halftone screen and the transparency multiple number are selected on the image forming apparatus 200. However, if the image forming apparatus 200 is connected to the print control terminal 100 as illustrated in FIG. 1, the halftone screen and/or the transparency multiple number may be selected on the print control terminal 100, and the image forming apparatus 200 may receive and use information regarding the selected halftone screen and/or transparency multiple number from the print control terminal 100.

As described above, the image forming apparatus 200 according to exemplary embodiments of the present general inventive concept can select a halftone screen corresponding to a print option selected by a user, and can change a transparency multiple number according to the characteristics of the halftone screen to reduce image quality degradation and improve the quality of an output image.

FIGS. 5A to 6D are output images of transparency objects in which transparency is applied according to halftone screens.

Figure 5A:
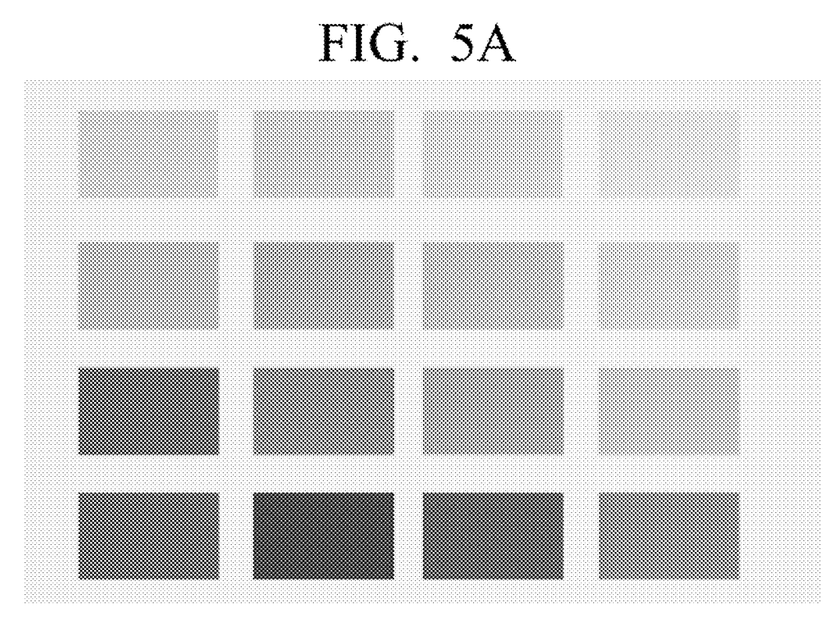
Figure 5B:
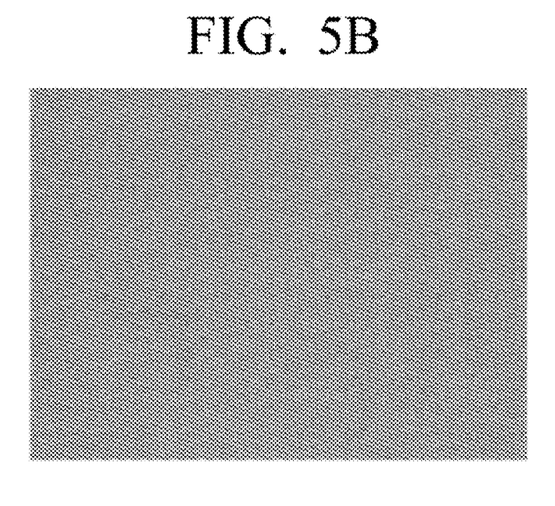
Figure 5C:
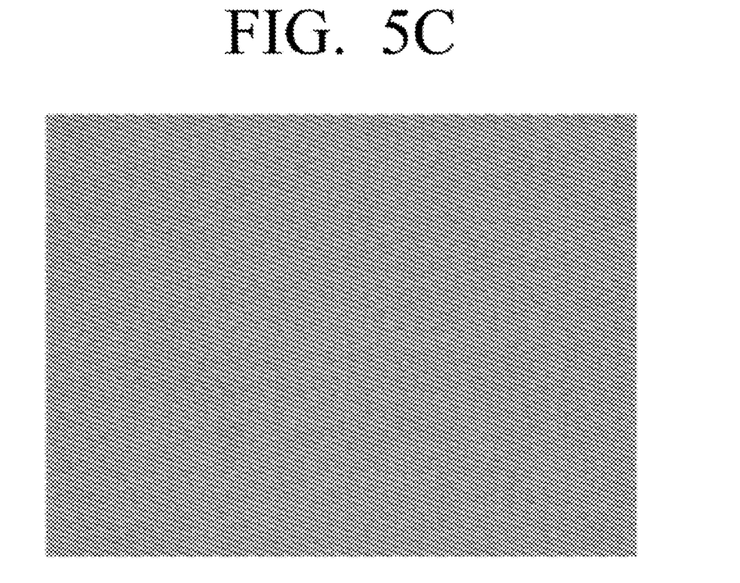
Figure 5D:
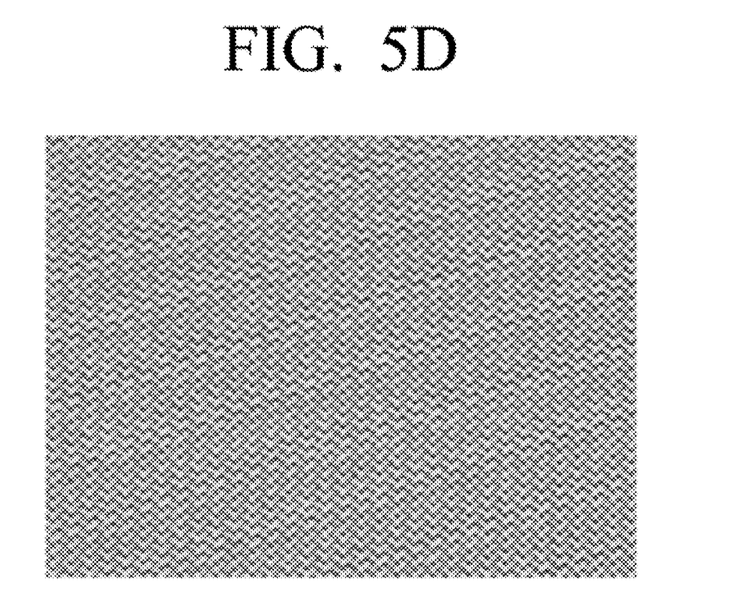

FIG. 5A illustrates a test image of an object in which transparency of 50% is applied. FIG. 5B illustrates an output image in which transparency multiple number 1×1 is applied to the test image of FIG. 5A. FIG. 5C illustrates an output image in which transparency multiple number 2×2 is applied to the test image of FIG. 5A, and FIG. 5D illustrates an output image in which transparency multiple number 4×4 is applied to the test image of FIG. 5A.

Comparing FIGS. 5A to 5D, the output image to which transparency multiple number 1×1 is applied has the best image quality, and the output image to which transparency multiple number 4×4 is applied has the worst image quality. In general, an image to which transparency multiple number 1×1 is applied has a smooth display. In this case, it is possible that transparency multiple number 1×1 may be preferable.

However, it is possible that the image forming apparatus may cause jitter on a print image due to mechanical factors. In this case, since the transparency pattern itself operates similarly as a high LPI screen, it may not be preferable to apply transparency multiple number 1×1 to an image where jitter is expected to occur. This situation will be explained in more detail below with reference to FIGS. 6A-6D.

Figure 6A:
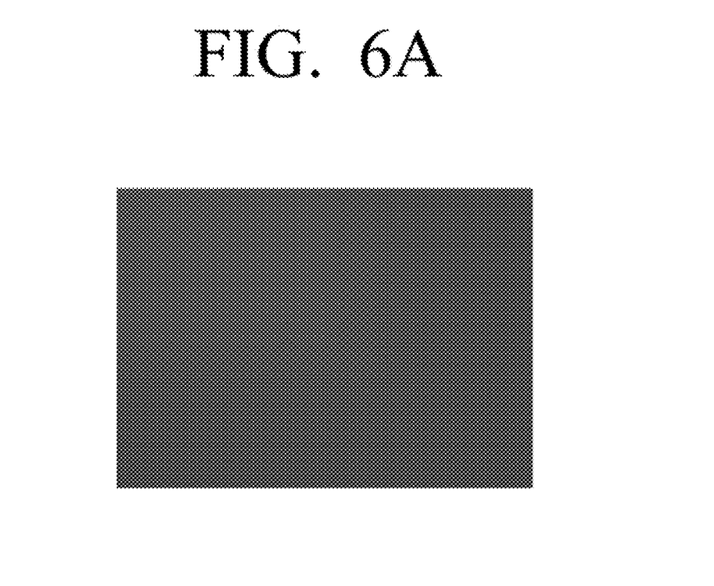
Figure 6B:
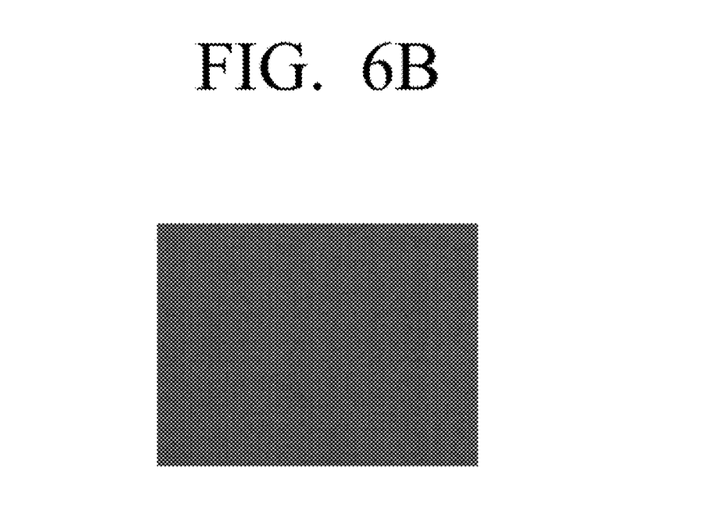

FIG. 6A illustrates a test image of an object containing a center square having rounded corners to which transparency of 50% is applied. FIG. 6B illustrates an output image in which transparency multiple number 1×1 is applied to the test image of FIG. 6A, FIG. 6C illustrates an output image in which transparency multiple number 2×2 is applied to the test image of FIG. 6A, and FIG. 6D illustrates an output image in which transparency multiple number 4×4 is applied to the test image of FIG. 6A.

Figure 6C:
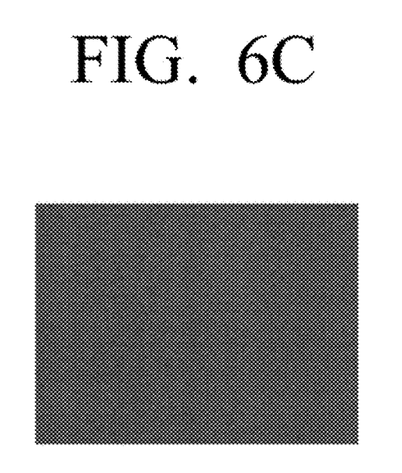
Figure 6D:
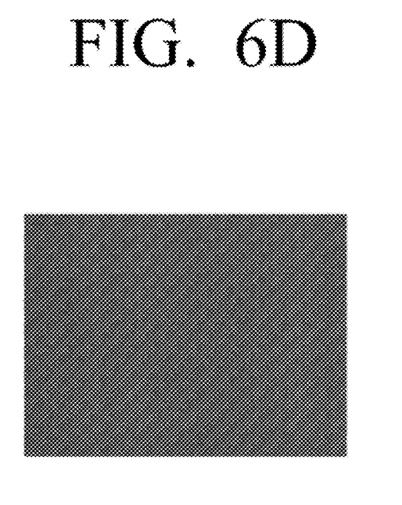

Comparing FIGS. 6B to 6D, the output image (FIG. 6B) to which transparency multiple number 1×1 is applied illustrates excessive jitter, but the output images (FIGS. 6C and 6D) to which transparency multiple numbers 2×2 and 4×4 are applied illustrates reduced jitter.

Figure 7:
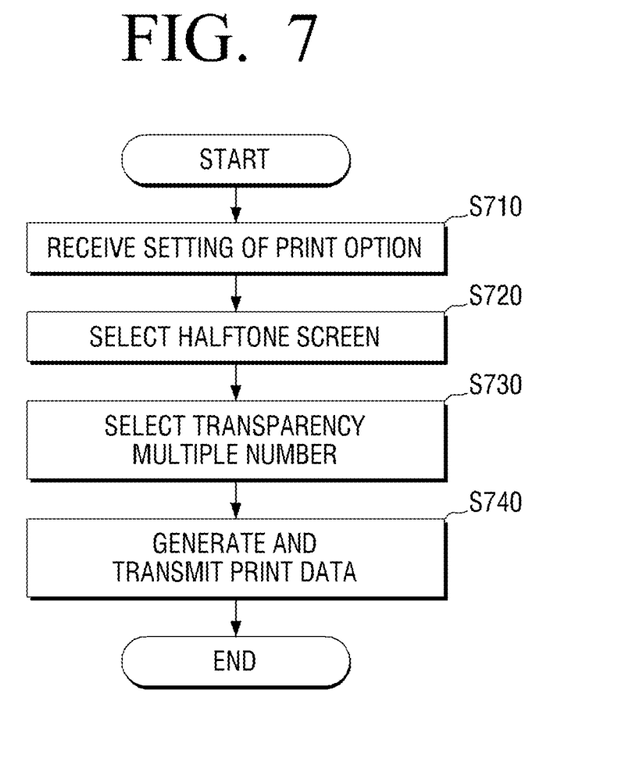
FIG. 7 is a flowchart illustrating a print control method according to an exemplary embodiment of the present general inventive concept.

FIG. 7 is a flowchart illustrating a print control method according to an exemplary embodiment of the present general inventive concept.

If a user sets a print command and print options to print a document in operation S710, the print control terminal 100 selects a halftone screen to be applied to the document in operation S720. Here, the print control terminal 100 may select a halftone screen based on a selected quality of printing such as high quality printing, normal printing, and high speed printing, and other print options such as color printing and edge enhancement printing, among the print options selected by the user.

The print control terminal 100 selects a transparency multiple number to correspond to the selected halftone screen in operation S730. That is, the print control terminal 100 can select a transparency multiple number which does not cause image quality degradation when applied to the selected halftone screen. Since a method of selecting a transparency multiple number was described above with reference to the transparency multiple number selection unit 142 of FIG. 1, and FIGS. 5 and 6, a detailed description thereof will be omitted here for convenience of description.

Referring to FIG. 7, the print control terminal 100 generates print data for the document to be printed according to the selected transparency multiple number in operation S740. The selected transparency multiple number may be applied to the print data so that a transparency operation is performed using the selected transparency multiple number.

The print control terminal 100 transmits the generated print data and the print options to an image forming apparatus in operation S750. Here, the generated print data may be stored in the image forming apparatus. For example, since the document selected by the user may be used repeatedly, the image forming apparatus may store the generated print data.

The print control methods of the present general inventive concept can improve the quality of an output image by virtue of selecting a halftone screen corresponding to the print option selected by the user and changing a transparency multiple number according to the characteristics of the selected halftone screen. The exemplary print control method described with reference to FIG. 7 may be performed not only on the print control terminal 100 of FIG. 1 but also on other print control terminals.

Figure 8:
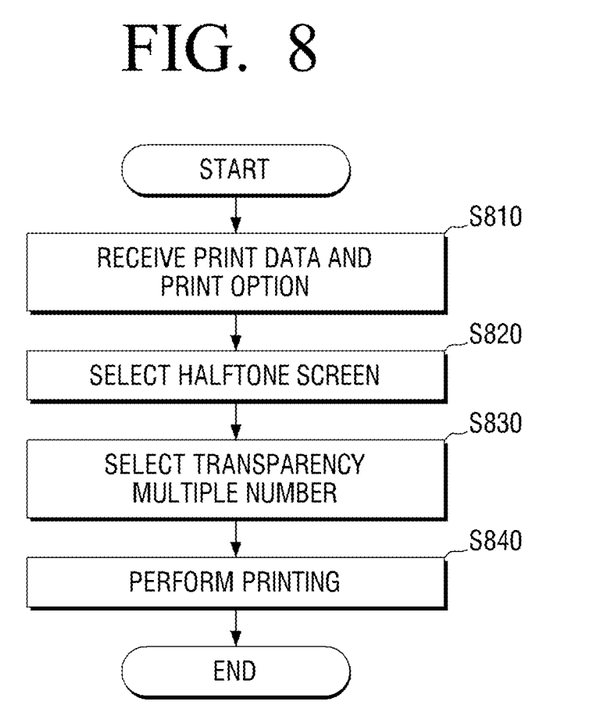
FIG. 8 is a flowchart illustrating a print control method according to an exemplary embodiment of the present general inventive concept.

FIG. 8 is a flowchart illustrating an image forming method according to an exemplary embodiment of the present general inventive concept.

Referring to FIG. 8, if print data and print options are received from a print control terminal in operation S810, a halftone screen may be selected based on the received print option and applied to the print data in operation S820. That is, a halftone screen may be selected based on consideration of the quality of printing such as high quality printing, normal printing, and high speed printing, and other print options such as color printing and edge enhancement printing, among the received print options.

A transparency multiple number is then selected to correspond to the selected halftone screen in operation S830. Here, the transparency multiple number which does not cause any degradation of image quality when applied to the selected halftone screen may be selected. Since an exemplary method of selecting a transparency multiple number was described above, a detailed description thereof will be omitted here for convenience of description.

Referring again to FIG. 8, the print data which are received according to the selected halftone screen and transparency multiple number are printed in operation S840. That is, the print data which are received according to the selected halftone screen and transparency multiple number are rendered, and then the rendered print data are printed according to the selections.

As described herein, the image forming method according to an exemplary embodiment of the present general inventive concept can select a halftone screen corresponding to a print option selected by a user, and can change a transparency multiple number according to the characteristics of the selected halftone screen to reduce image quality degradation and improve the quality of an output image. Those skilled in the art will appreciate that the image forming method described with reference to FIG. 8 may be performed on other types of image forming apparatuses in addition to the image forming apparatus 200 of FIG. 2.

Although a few example embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A print control terminal connected to an image forming apparatus, the print control terminal comprising:
a screen selection unit to determine a halftone screen to be applied to a document to be printed;
a transparency multiple number selection unit to change a transparency multiple number according to at least one of characteristics of the determined halftone screen; and
a print data generation unit to generate print data of the document according to the changed transparency multiple number.

2. The print control terminal of claim 1, further comprising:
a user interface to receive a setting of print options of the document; and
a communication interface to transmit the generated print data and the set print options to the image forming apparatus.

3. The print control terminal of claim 2, wherein the screen selection unit determines the halftone screen using information regarding a quality of printing, color printing, and edge enhancement printing among the set print options.

4. The print control terminal of claim 1, wherein the characteristics of the determined halftone screen include at least one of a lines per inch (LPI), an angle, and a dot growth of the determined halftone screen.

5. The print control terminal of claim 1, wherein the transparency multiple number selection unit selects one of transparency multiple numbers 1×1, 2×2, and 4×4 as the changed transparency multiple number according to the characteristics of the determined halftone screen.

6. The print control terminal of claim 1, wherein the transparency multiple number selection unit selects the transparency multiple number which does not cause a problem of image quality degradation when used with the determined halftone screen, based on consideration of the characteristics of the determined halftone screen.

7. The print control terminal of claim 1, further comprising:
a storage unit to store a lookup table including optimal transparency multiple numbers for all halftone screens.

8. The print control terminal of claim 7, wherein the transparency multiple number selection unit selects one of the optimal transparency multiple numbers as the changed transparency multiple number for the determined halftone screen based on the lookup table stored in the storage unit.

9. An image forming apparatus connected to a print control terminal, the image forming apparatus comprising:
a screen selection unit to determine a halftone screen to be applied to print data received from the print control terminal.
a transparency multiple number selection unit to change a transparency multiple number according to at least one of characteristics of the determined halftone screen; and
an image forming unit to print the received print data using the determined halftone screen and the changed transparency multiple number.

10. The image forming apparatus of claim 9, further comprising:
a communication interface to receive print options together with the print data from the print control terminal, and
wherein the screen selection unit determines the halftone screen using information regarding a quality of printing, color printing, and edge enhancement printing among the received print options.

11. The image forming apparatus of claim 9, wherein the characteristics of the determined halftone screen include at least one of a lines per inch (LPI), an angle, and a dot growth of the determined halftone screen.

12. The image forming apparatus of claim 9, wherein the transparency multiple number selection unit selects one of transparency multiple numbers 1×1, 2×2, and 4×4 as the transparency multiple number according to the characteristics of the determined halftone screen.

13. The image forming apparatus of claim 9, wherein the transparency multiple number selection unit selects the transparency multiple number which does not cause a problem of image quality degradation when used with the determined halftone screen, based on consideration of the characteristics of the determined halftone screen.

14. The image forming apparatus of claim 9, further comprising:
a storage unit to store a lookup table including optimal transparency multiple numbers for all halftone screens.

15. The image forming apparatus of claim 14, wherein the transparency multiple number selection unit selects one of the optimal transparency multiple numbers as the changed transparency multiple number for the determined halftone screen based on the lookup table stored in the storage unit.

16. A print control method of a print control terminal connected to an image forming apparatus, the print control method comprising:
determining a halftone screen to be applied to a document to be printed;
changing a transparency multiple number according to at least one of characteristics of the determined halftone screen; and
generating print data of the document according to the changed transparency multiple number.

17. The print control method of claim 16, further comprising:
receiving a setting of print options for a document; and
transmitting the generated print data and the set print options to the image forming apparatus.

18. The print control method of claim 16, wherein the characteristics of the determined halftone screen include at least one of a lines per inch (LPI), an angle, and a dot growth of the determined halftone screen.

19. The print control method of claim 16, wherein the changing a transparency multiple number comprises selecting the transparency multiple number which does not cause a problem of image quality degradation when used with the determined halftone screen, based on consideration of the characteristics of the determined halftone screen.

20. The print control method of claim 16, further comprising:
providing a pre-stored lookup table including optimal transparency multiple numbers for all halftone screens,
wherein the changing a transparency multiple number comprises selecting one optimal transparency multiple number as the changed transparency multiple number for the determined halftone screen based on the pre-stored lookup table including the optimal transparency multiple numbers for all the halftone screens.

21. An image forming method of an image forming apparatus connected to a print control terminal, the image forming method comprising:
determining a halftone screen to be applied to print data received from the print control terminal,
changing a transparency multiple number according to at least one of characteristics of the determined halftone screen; and
printing the received print data using the determined halftone screen and the changed transparency multiple number.

22. The image forming method of claim 21, wherein the characteristics of the determined halftone screen include at least one of a lines per inch (LPI), an angle, and a dot growth of the determined halftone screen.

23. The image forming method of claim 21, wherein the changing a transparency multiple number comprises selecting the transparency multiple number which does not cause a problem of image quality degradation when used with the determined halftone screen, based on consideration of the characteristics of the determined halftone screen.

24. The image forming method of claim 21, further comprising:
providing a pre-stored lookup table including optimal transparency multiple numbers for all halftone screens,
wherein the changing a transparency multiple number comprises selecting one optimal transparency multiple number as the changed transparency multiple number for the determined halftone screen based on the pre-stored lookup table including the optimal transparency multiple numbers for all the halftone screens.

* * * * *